United States Patent [19]

Murofushi et al.

[11] Patent Number: 4,602,540
[45] Date of Patent: Jul. 29, 1986

[54] PRECISION MACHINE SYSTEM

[75] Inventors: Masatoshi Murofushi, Mishima; Isamu Tanimoto, Numazu; Toshio Sagara, Shizuoka, all of Japan

[73] Assignee: Toshiba Kikai Kabushiki Kaisha, Tokyo, Japan

[21] Appl. No.: 701,811

[22] Filed: Feb. 19, 1985

Related U.S. Application Data

[63] Continuation of Ser. No. 405,904, Aug. 6, 1982, abandoned.

[30] Foreign Application Priority Data

Nov. 26, 1981 [JP] Japan .................. 56-189601
Nov. 26, 1981 [JP] Japan .................. 56-189602

[51] Int. Cl.⁴ .................. B23B 25/06; B23B 21/00
[52] U.S. Cl. .................. 82/2 B; 82/24 R; 318/593; 318/640; 364/182
[58] Field of Search .......... 82/2 B, 24 R; 318/592, 318/593, 594, 640; 364/182

[56] References Cited

U.S. PATENT DOCUMENTS

| | | | |
|---|---|---|---|
| 3,429,155 | 2/1969 | Hines | 82/24 R |
| 3,449,986 | 6/1969 | Joichi | 82/24 R |
| 3,491,627 | 1/1970 | Burr | 82/24 R |
| 3,504,582 | 4/1970 | Klee et al. | 82/24 R |
| 3,561,301 | 2/1971 | Sharp et al. | 82/24 R |
| 3,566,239 | 2/1971 | Taniguchi | 318/640 |
| 3,608,409 | 9/1971 | Schmidt | 82/24 R |
| 3,719,879 | 3/1973 | Marcy | 318/593 |
| 4,038,890 | 8/1977 | Winget | 82/2 B |
| 4,128,794 | 12/1978 | Burleson | 318/603 |
| 4,203,062 | 5/1980 | Bathen | 318/571 |

FOREIGN PATENT DOCUMENTS 904730 7/1962 United Kingdom .............. 82/24 R Primary Examiner—Francis S. Husar
Assistant Examiner—Jerry Kearns
Attorney, Agent, or Firm—Cushman, Darby & Cushman

[57] ABSTRACT

A precision machining system for machining a workpiece into a desired surface with two tool driving units. A first drive unit moves the tool along at least two axes to shape the workpiece similar to a desired surface. A second drive unit moves the tool along one of the axes in a very finely controlled manner. A measuring unit measures the tool position with an accuracy higher than that to which the first drive unit can respond. A signal producing unit is responsive to the measuring unit for producing a control signal for controlling the operation of the second drive unit while the first drive unit is operating.

16 Claims, 11 Drawing Figures

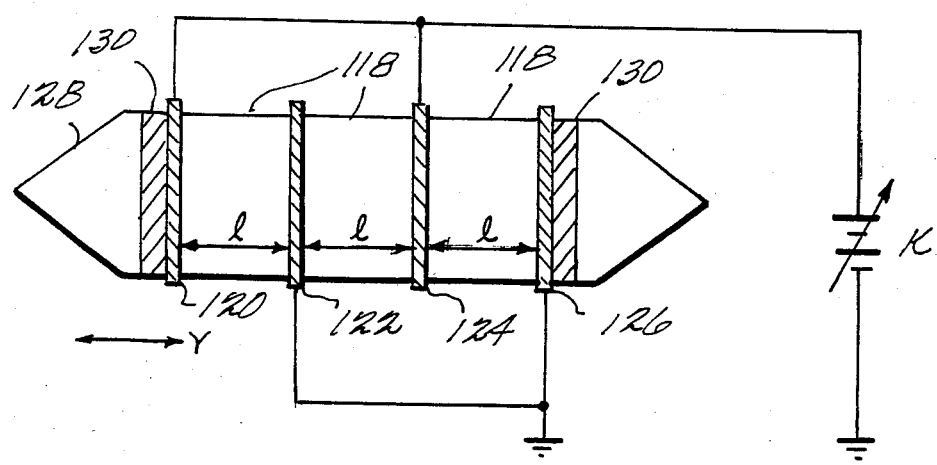
F I G. 5
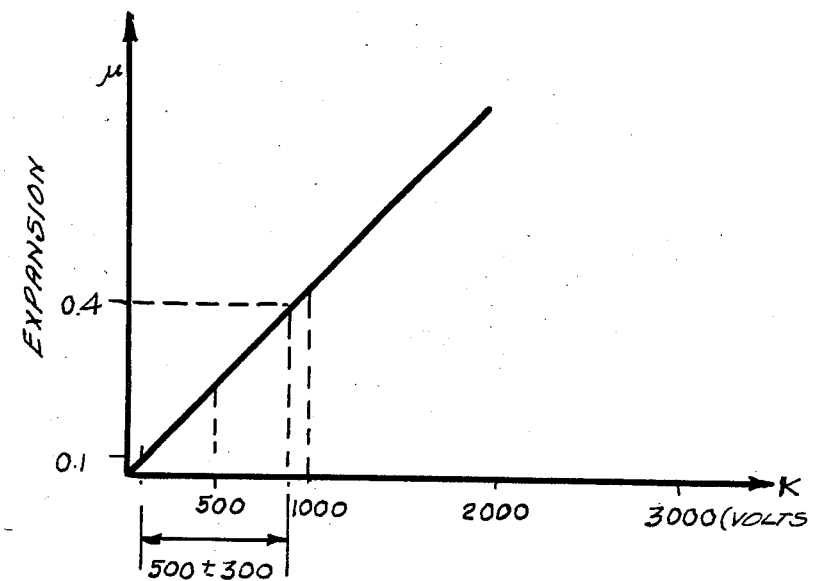
F I G. 6

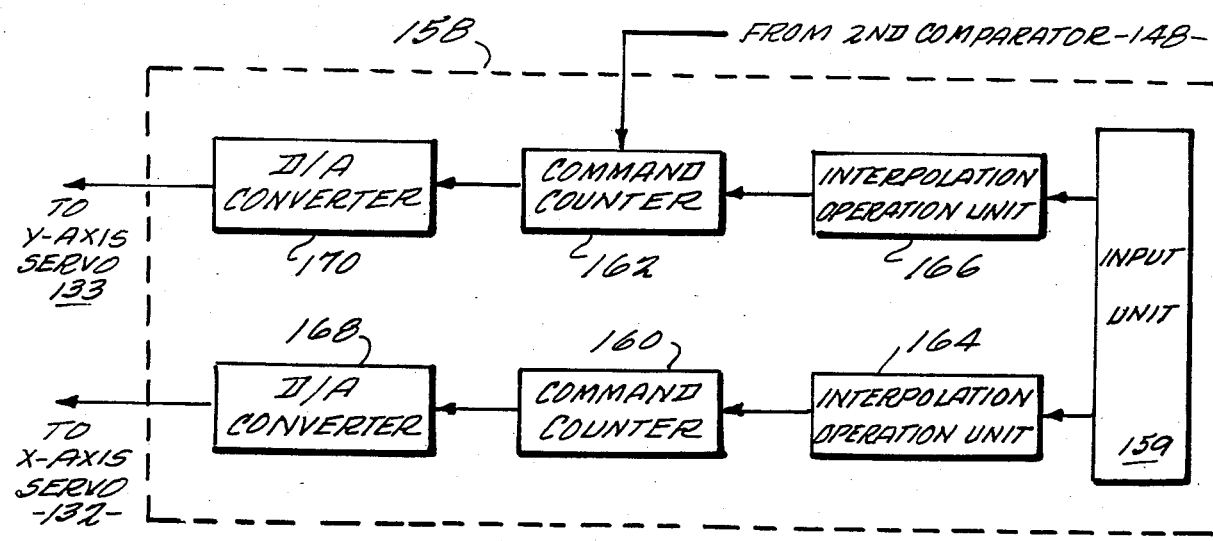
F I G. 7
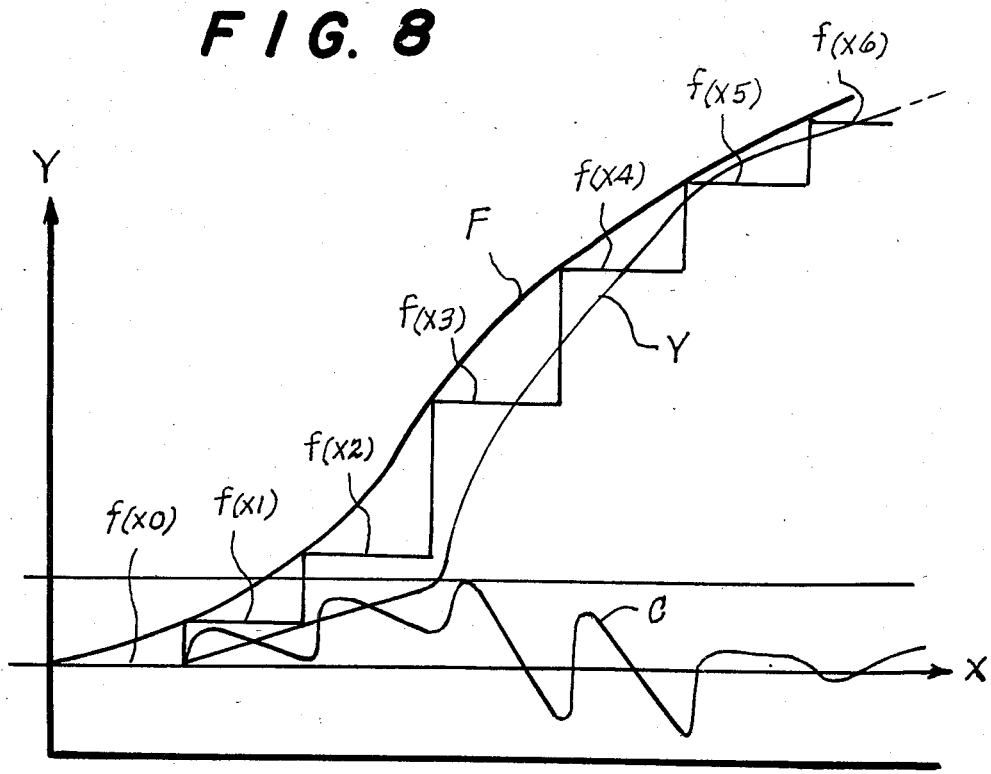
F I G. 8

PRECISION MACHINE SYSTEM

This is a continuation of application Ser. No. 405,904, filed Aug. 6, 1982, now abandoned.

BACKGROUND OF THE INVENTION

1. Field of the Invention

The present invention relates to a precision system for machining symmetrical surfaces generated from conic sections to a mirror finish.

2. Description of the Prior Art

In the field of modern precision machinery, it has been desired to develop a machine tool having a machining precision of smaller than 0.1 micron as required for laser technology and super-LSI technology. With conventional machining tools, however, machining precision of smaller than 0.1 micron could be achieved chiefly by grinding, and objects which could be ground have been limited to flat surfaces and circumferential surfaces such as the periphery of cylinders. With conventional machine tools, therefore, it was not possible to machine surfaces generated from conic sections, such as parabolic surfaces and hyperboloids, to a mirror finish.

The reasons for this inability with conventional machine tools could be attributed to both, errors produced by the changing temperature of machine parts of the machine tool and to problems with the system for driving the tool, particularly insufficient precision of the guide surface, poor resolution of the motor, insufficient precision of the feed screw, insufficient precision of the detector for position feedback, and inadequate response characteristics of the drive system. Plane surfaces and circumferential surfaces are machined fundamentally by controlling the relative movement between a grinder that moves only along a single axis and the workpiece. In machining surfaces generated from conic sections, however, control must be effected along the directions of two axes simultaneously.

In conventional feed drive systems, if precision is not critical, the two axes (X,Y) have been controlled simultaneously by a numerical control (NC) machine tool. With NC machine tools, however, the detection of table movement or the like is precise to 1 micron on the average, and is precise to only about ±0.5 micron even in particularly carefully designed machines. Furthermore, if a minimum resolution instruction value is set to 0.01 (micron/pulse) and a maximum feed rate for cutting to 600 mm/minute, pulses must be distributed at high speeds, on the order of 1 MHz, so that translating commands into control pulses (interpretation) for NC machine tools becomes difficult.

With regard to the position detector for controlling the feedback, although the amount of movement can be measured fairly accurately, only a measuring device employing a laser can now offer the precision of about 0.01 micron. Even when the laser-type measuring device is employed, however, the drive system is not capable of responding to error signals that are produced.

SUMMARY OF THE INVENTION

The object of the present invention is to provide a precision machining system which is capable of machining surfaces generated from conic sections while maintaining a precision of smaller than 0.1 micron. For this purpose, a tool-holding unit of the present invention is positioned along a Y axis by a fine displacing drive unit which operates at high speeds and with high precision. Also, an X-axis drive system and a Y-axis drive system are provided for driving the tool-holding unit in the XY plane. The position of the tool-holding unit is measured by an optical length measuring device, and the difference between the measured value and a desired value is compensated by the fine displacing drive unit. When the amount of compensation in the fine displacing drive unit exceeds a predetermined value, the Y-axis drive system is actuated so that the amount of compensation by the fine displacing drive unit lies within a predetermined range.

BRIEF DESCRIPTON OF THE DRAWINGS

FIG. 5 is a side elevational, partially schematic view showing a piezo-electric fine displacing element employed in the above embodiment;

FIG. 6 is a diagram showing the relation between the voltage applied to the piezo-electric crystal in FIG. 5 and the amount of expansion;

FIG. 7 is a block diagram illustrating the main section of the NC control unit;

FIG. 8 is a graph showing the operation of the controller in FIG. 1;

DESCRIPTION OF THE PREFERRED EMBODIMENT

Figure 1:
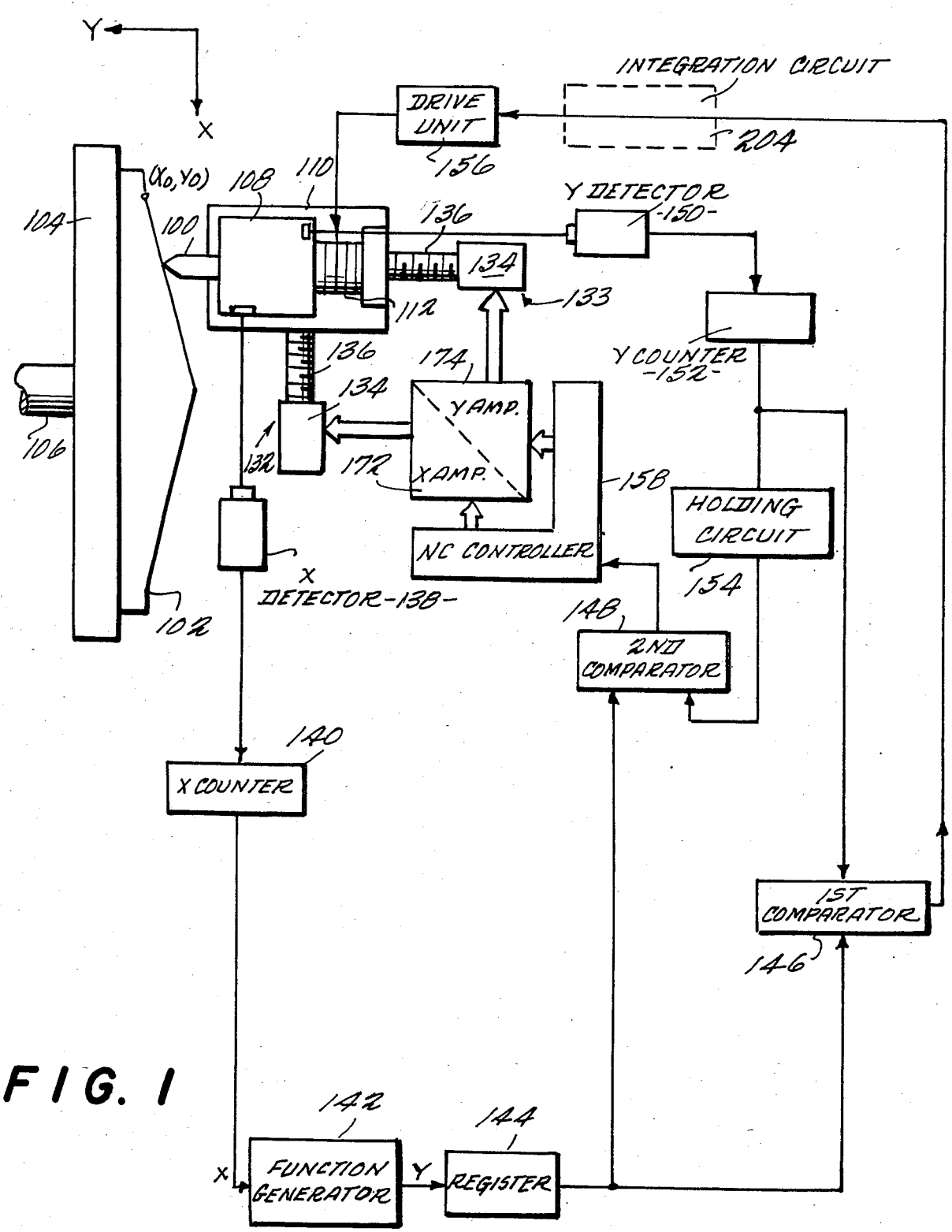
FIG. 1 is a block diagram illustrating an embodiment of the present invention.

An embodiment of the invention will be described below in detail with reference to a block diagram of FIG. 1, in which a cutting tool 100 comes into contact with a workpiece 102 that is held by a chuck 104 mounted on a rotary shaft 106. Cutting tool 100 is moved relative to workpiece 102 to machine the surface thereof into any desired shape. In the following description, cutting tool 100 is actuated along Cartesian coordinates consisting of a Y axis parallel with rotary shaft 106 and an X axis normal to rotary shaft 106. Cutting tool 100 is held by a tool-holding unit 108 which, in turn, is connected to a tool support 110 by means of a fine displacing element 112.

Figure 2:
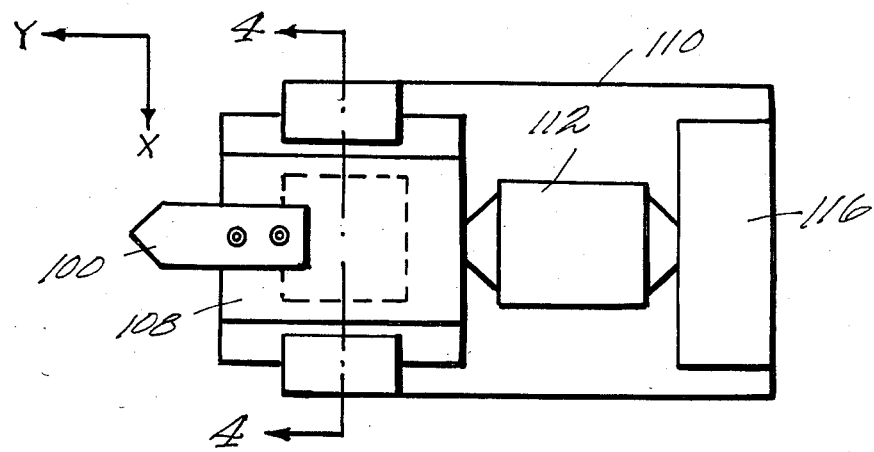
FIG. 2 is a top plan view showing a tool support of the above-mentioned embodiment.
Figure 3:
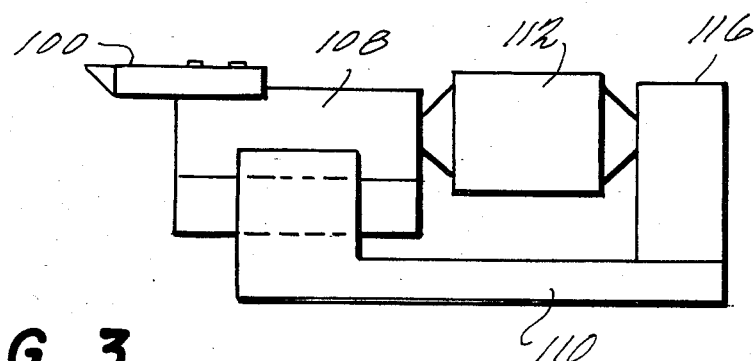
FIG. 3 is a side elevational view of FIG. 2.
Figure 4:
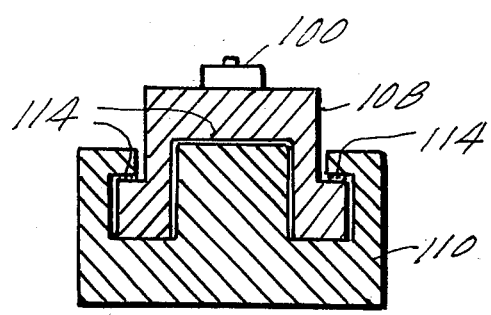
FIG. 4 is a sectional view taken along the line 4—4 in FIG. 2.

FIGS. 2 to 4 are various views illustrating tool support 110. Tool-holding unit 108 is held by tool support 110 via static hydraulic bearings 114 so as to slide in the Y direction. Cutting tool 100 is attached to the front end of tool-holding unit 108, and the ends of fine displacing element 112 are firmly attached to the rear end of tool-holding unit 108 and to an end wall 116 protruding from the end of tool support 110.

FIG. 5 is a side view showing an example of fine displacing element 112 which includes, three piezo-electric elements 118 that are stacked in the form of layers with electrodes 120,122,124 and 126 made of a silver foil or the like being interposed between them. Coupling members 128 are attached to the outer sides of electrodes 120 and 126 via insulating members 130. Electrodes 122 and 126 are grounded, and several hundred volts are applied to electrodes 120 and 124, so that piezo-electric elements 118 expand and contract in the direction in which they are stacked.

FIG. 6 is a diagram showing the relation between the voltage K applied to fine displacing element 112 and the amount of expansion. When a voltage K of 500 volts is applied to a single piezo-electric element 118 having a thickness of 1 mm, an expansion of 0.25 micron can be obtained. If the applied voltage is controlled over a range of 500±300 volts so that each piezo-electric element 118 produces the displacement of ±0.15 micron, the thickness of the stack of three piezo-electric elements 118 can be controlled over a range of 0.3 micron to 1.2 microns. When the voltage is controlled within a suitable range, thickness varies nearly linearly with respect to the applied voltage, and the response characteristics are also quite good. Therefore, by controlling the voltage applied to fine displacing element 112, tool-holding unit 108 can be driven relative to tool support 110 along the Y axis to control the position of cutting tool 100.

In FIG. 1, reference numeral 132 denotes an X-axis drive mechanism which drives tool support 110 along the X axis. Y-axis drive mechanism 133 drives tool support 110 along the Y axis. Drive mechanisms 132 and 133 each include a drive motor 134 and a feed screw 136 that is rotated by drive motors 134. Length measuring unit 138 produces pulses related to the movement of tool-holding unit 108 along the X axis and X-axis position counter 140 counts the pulses to produce an indication of the position of the end portion of cutting tool 100 in the X direction. The value counted by X-axis position counter 140 is fed to function generator 142 which determines the corresponding desired position of the end portion of cutting tool 100 along the Y axis depending upon the desired curved surface that is to be machined. The Y-axis desired position is fed to a data register 144, and the contents of data register 144 are fed both to a first comparator 146 and to a second comparator 148.

The pulses produced by Y-axis length measuring unit 150 are counted by Y-axis position counter 152, and the counted value corresponding to actual position along the Y-axis of the end portion of cutting tool 100 is fed both to second comparator 148 via a holding circuit 154 and to first comparator 146. The output of first comparator 146 is converted into a voltage at a predetermined ratio by fine displacing drive circuit 156, and is applied to fine displacing element 112. Second comparator 148 feeds a drive signal to NC control unit 158 to drive tool support 110 by means of drive system 133 by a predetermined distance in the Y direction every time the difference between the measured position Y and the desired position exceeds a predetermined value. In response to the drive signal from second comparator 148, NC control unit 158 drives tool support 110 by a predetermined amount in a stepped manner. Therefore, by suitably setting the predetermined amount, the control voltage applied to fine displacing element 112 can be maintained within a suitable range, so that linearity is not lost by the application of an excessive voltage.

FIG. 7 is a block diagram illustrating the main section of NC control unit 158, in which position commands for the X direction and the Y direction are received from input unit 159. Conventionally in the art of NC control units the position commands are stored on tape so that input unit 159 is conventionally a tape drive. Obviously other types of input devices could also be used. Conventional interpolation operation units 164 and 166 receive the position commands from input unit 159 and generate position pulses related to the desired movement of tool support 110. These pulses are counted by counters 160 and 162, and are converted into analog signals through D/A converters 168 and 170 and are then fed to servo amplifiers 172 and 174. The drive signal produced by second comparator 148 is fed to Y command counter 162. Thus the output of second comparator 148 may be a pulse which is "OR-ed" with the pulses from interpolation operation unit 166 at an input stage of counter 162.

Being constructed as mentioned above, prior to initiating the machining operation, NC control unit 158 drives cutting tool 100 to an origin $(X_0, Y_0)$ from where workpiece 102 is to be machined, and further resets all of the counters and registers. When the machining operation is initiated, cutting tool 100 is driven at a speed from the outer circumference of workpiece 102 toward the center by X-axis drive mechanism 132 that is powered by X-axis servo amplifier 172 responsive to the data which is fed from a paper tape or the like in input unit 159. X-axis length measuring unit 138 produces a pulse for every 0.01 micron, for example, depending upon the position in the X-axis direction of tool-holding unit 108 which holds cutting tool 100. The number of pulses is counted by X-axis position counter 140 to obtain a measured X direction position of cutting tool 100 relative to the origin $X_0$ from where the machining operation is started. The measured value X position is fed to function generator 142, and a corresponding desired Y direction position is supplied to data register 144. In this case, the position is given by X-axis position counter 140 in the form of a digital value. Therefore, the Y position determination is repeated every predetermined amount of movement in the X direction, for example, after every 5 microns, depending upon the precision and response characteristics of the drive system.

Pulses produced by Y-axis length measuring unit 150 related to the actual position of cutting tool 100 in the Y direction, are counted by Y-axis position counter 152, and the measured Y position is fed to holding circuit 154 which holds the measured Y position in synchronism with the changes of the output of function generator 142.

The measured Y position in holding circuit 154 and the desired Y position stored in data register 144 are fed to second comparator 148 and are compared. Whenever the difference thereof exceeds a predetermined value, second comparator 148 feeds an output to NC control unit 158 which drives Y-axis drive mechanism 133 via Y-axis servo amplifier 174, such that the position of cutting tool 100 in the Y direction is moved in a stepped manner. At the same time, the difference between the measured Y position and the desired Y position is found by first comparator 146. This difference is converted into a corresponding voltage through fine displacing drive circuit 156 to control the voltage that is applied to fine displacing element 112, in order to control the position of tool-holding unit 108.

FIG. 8 illustrates the operation of the controller of FIG. 1. In FIG. 8, function F represents the ideal shape of the surface to be machined, f(x) represents the desired position generated by function generator 142 and Y represents the actual position of cutting tool 100. Curve C represents the amount of expansion or contraction of fine displacing element 112 from its central position. As long as curve C stays within the range of linearity, fine displacing element 112 provides all adjustment in the Y direction (such as for $f(X_0)$ through $f(X_2)$). However, when the difference between the desired position and the actual position becomes so great that fine displacement element 112 would have to leave the linear range to respond (such as at $f(X_3)$), the output of second comparator 148 causes NC controller 158 to drive Y-axis servo-amplifier 174 and Y-axis drive mechanism 133 so as to relieve fine displacing element 112. Accordingly, the drive signal applied to fine displacing element 112 can be controlled to lie within a predetermined range such that good linearity is maintained.

With this embodiment of the present invention, errors in the position of cutting tool 100 produced by the mechanical driving mechanism are corrected by fine displacing element 112 which works based upon the piezoelectric effect. Furthermore, if the voltage applied to fine displacing element 112 exceeds a proper range, cutting tool 100 is so driven by the drive mechanism that the correction quantity decreases. Consequently, fine displacing element 112 operates within a proper range at all times.

Figure 9:
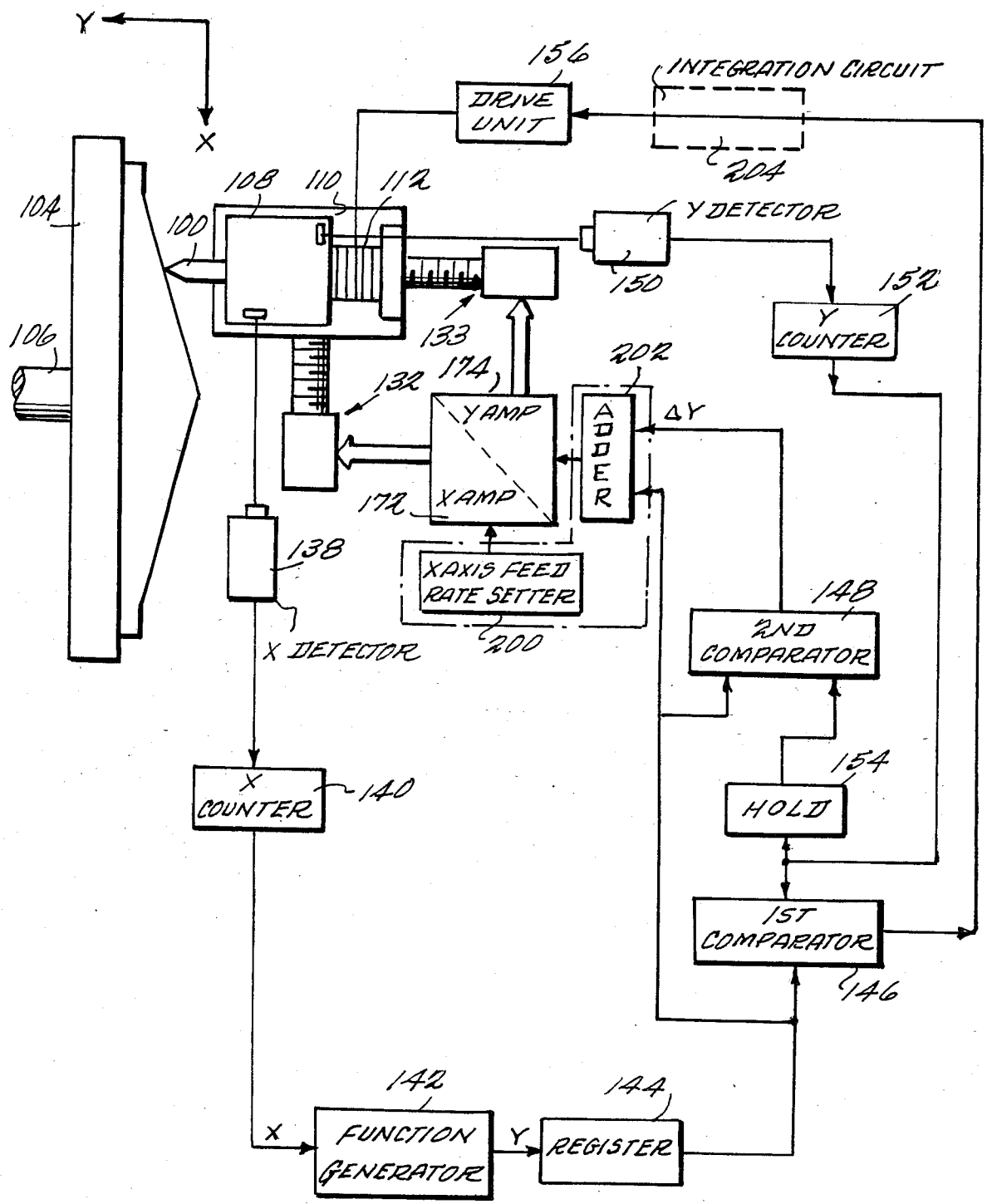
FIG. 9 is a block diagram illustrating another embodiment of the present invention.

FIG. 9 shows a circuit block diagram of a second embodiment of the present invention. In this block diagram, instead of NC controller 158 as shown in FIG. 1, setting device 200 for producing a signal representing the feed rate along the X axis and adder 202 are provided. Elements numbered the same as in FIG. 1 have functions identical to the same elements of FIG. 1.

Setting device 200 produces a feed rate signal by which tool support 110 is driven at a constant speed in the X direction. Setting device 200 may produce a plurality of feed rate signals each indicating a different rate for different intervals in the X direction.

For example, if workpiece 102 has a steep slope portion and a gentle slope portion, the feed rate for the steep slope is set to be small, and the feed rate for the gentle slope is set to be large so that the value of f(x) may change continuously.

Adder 202 adds the value of data register 144 and the output value from the second comparator 148 and the resultant value is supplied to servo amplifier 174 after D/A conversion. The system shown in FIG. 10 may be constructed at lower cost than that of FIG. 1.

The present invention should not be limited to the above-mentioned embodiments only. For example, good control is provided even if second comparator 148 and hold 154 are eliminated. First comparator 146 and fine displacing element 112 still guarantee a fast, accurate response. Since the output of function generator 142 is applied through adder 202 to Y-axis servo amplifier 174, Y-axis drive system 133 is still able to maintain fine displacing element 112 in a relatively linear range. Obviously, control will not be quite as good as the embodiment in FIG. 9.

Also, function generator 142 need not be limited to the one which calculates, at high speed, the desired Y position based upon the measured X position. Instead, function generator 142 may be provided with a memory which stores the Y positions that have been calculated beforehand, so that the stored contents are read out successively.

Figure 10:
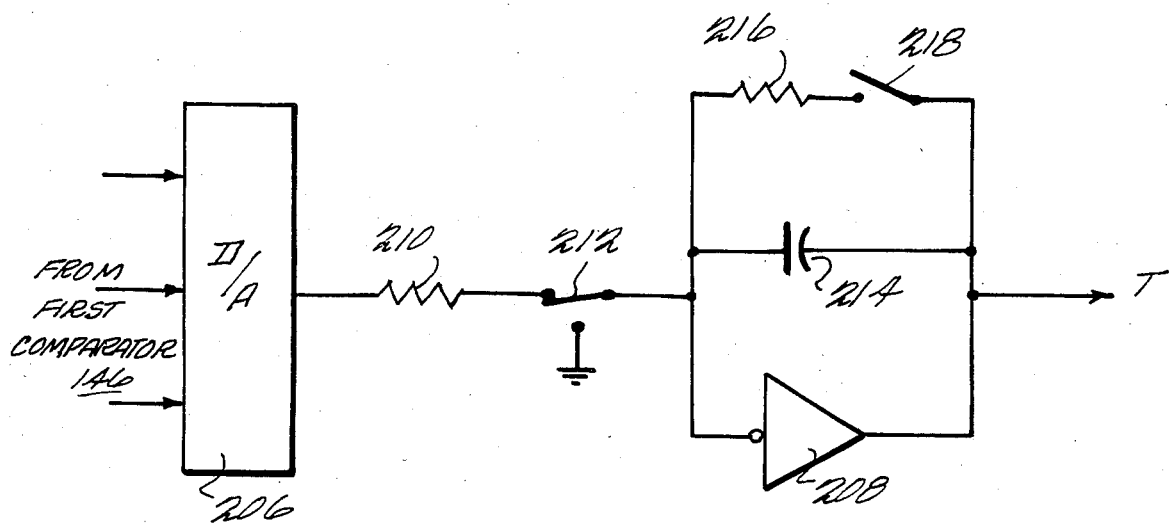
FIG. 10 is a circuit diagram showing an integration circuit according to an embodiment of the present invention.

When fine displacing element 112 responds too sharply to the drive signals, an integration circuit 204 may advantageously be inserted between the output of first comparator 146 and fine displacing element drive circuit 156 as indicated by a broken line in FIGS. 1 and 9. FIG. 10 is a circuit diagram illustrating an example of integration circuit 204. A digital signal consisting of a plurality of bits from first comparator 146 is converted into an analog signal through a digital-to-analog converter 206, and is fed to an operational amplifier 208 via a resistor 210 and a first switch 212. Operational amplifier 208 has a capacitor 214 connected across its input and output terminals and a series circuit, having a discharge resistor 216 and a second switch 218, is connected in parallel with capacitor 214.

In operation initially, first switch 212 is connected to resistor 210, and second switch 218 is opened so that the ananlog signals are integrated. After the integration is finished, first switch 212 is connected to ground potential, and second switch 218 is closed so that the electric charge stored in capacitor 214 is discharged.

Figure 11:
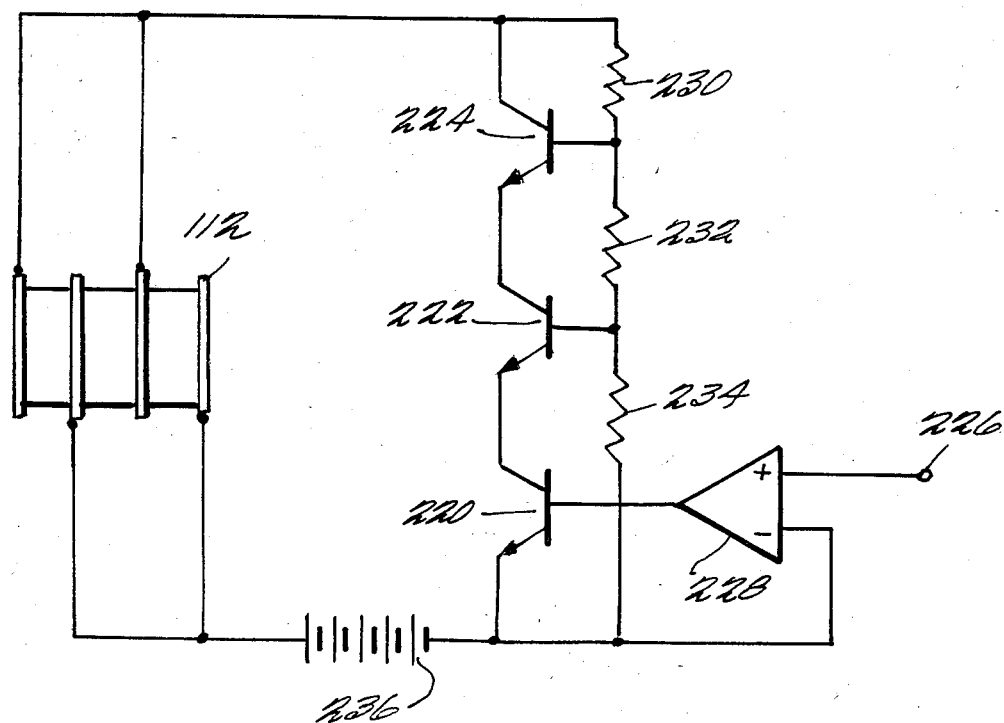
FIG. 11 is a circuit diagram illustrating an example of the fine displacing element drive circuit of the present invention.

FIG. 11 is a circuit diagram illustrating an example of a fine displacing element drive circuit 156, in which the collectors and emitters of three transistors 220, 222 and 224 are connected in cascade to control the voltage of several hundreds of volts applied to fine displacing element 112. An analog signal from first comparator 146 is applied to input terminal 226. This signal is fed to the base of transistor 220 via a buffer amplifier 228. Emitters and collectors of transistors 220, 222 and 224 are connected in cascade, a resistor 230 is inserted between the collector and the base of transistor 224, a resistor 232 is inserted between the base of transistor 224 and the base of transistor 222, and a resistor 234 is inserted between the base of transistor 222 and the emitter of transistor 220. A series circuit consisting of a power supply 236 of hundreds of volts and fine displacing element 112 is connected between the emitter of the transistor 222 and the collector of transistor 224. Owing to the above connection, the voltage applied across the emitter and the collector of transistors 220, 222 and 224 is reduced to about one-third the voltage of the power supply; i.e., required breakdown voltage of transistors 220, 222 and 224 can be loosened.

In the above-mentioned embodiments, furthermore, function generator 142 produces a desired position relative to the origin $Y_0$ of machining. Alternatively, function generator 142 may be so constructed as to produce the difference $Y_n - Y_{n-1}$ between the desired position $Y_{n-1}$ corresponding to the position $X_{n-1}$ in the X-axis direction and the desired position $Y_n$ corresponding to the position $X_n$ in the X-axis direction at that moment.

According to the present invention as illustrated in detail in the foregoing, the positional error of the cutting tool in the cutting direction caused by the mechanical driving mechanism is corrected by a fine displacing element, and the cutting tool is also driven by a drive mechanism so that the quantity of correction is reduced when the fine displacing element must operate outside of a proper range.

It is therefore possible to provide a precision machining system which is capable of machining surfaces generated from conic sections very precisely, while driving a fine displacing element within a proper range at all times.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A precision system for controlling the movement of a tool which moves relative to a workpiece to machine said workpiece into a desirable shape, said precision system comprising:

a tool holding unit for holding said tool;

a tool support operatively connected to said tool holding unit for holding said tool holding unit;

fine displacing drive means operatively connected to said tool holding unit for driving said tool holding unit relative to said tool support and along a first direction, in response to a fine displacing drive means control signal;

first tool support drive means operatively connected to said tool support for moving said tool support relative to said workpiece along said first direction;

second tool support drive means operatively connected to said tool support for moving said tool support relative to said workpiece along a second direction perpendicular to said first direction said first and second tool support drive means moving said tool support in accordance with a predetermined pattern of movement, and said first tool support drive means moving said tool support relative to said workpiece along said first direction by a predetermined amount in response to a tool support drive means control signal;

first measuring means operatively associated with said tool holding unit for measuring said tool position with respect to said workpiece along said second direction with accuracy higher than that to which said second tool support drive means can respond, and for outputting a second direction position signal;

function generating means operatively connected with said first measuring means for receiving said second direction position signal from said first measuring means and producing a desired position signal corresponding to a desired tool position along said first direction of said predetermined pattern of movement;

second measuring means operatively associated with said tool holding unit for measuring said tool position with respect to said workpiece along said first direction with accuracy higher than that to which said first tool support drive means can respond, and for outputting a first position signal;

first comparing means operatively connected with said function generating means and second measuring means for receiving said desired position signal from said function generating means and for receiving said first position signal from said second measuring means, and being operatively connected with said fine displacing drive means for producting said fine displacing drive means control control signal, representing a difference between said desired tool position and said tool position along said first direction for controlling the operation of said fine displacing drive means for driving said tool holding unit while said first and second tool support drive means are operating; and second comparing means operatively connected with said function generating means and second measuring means for receiving said desired position signal from said function generating means and for receiving said first position signal from said second measuring means and for producing said tool support drive means control signal, when the difference between said desired position signal and said first position signal exceeds a predetermined value and being operatively connected to said first tool support drive means, for causing said first tool support drive means to move said tool support relative to said workpiece along said first direction by said predetermined amount.

2. A precision system as in claim 1 wherein each of said first and second measuring means comprises a laser interferometer device.

3. A precision system as in claim 1, wherein said fine displacing means comprises a piezo-electric element.

4. A precision system as in claim 1 wherein said fine displacing drive means comprises a drive circuit having a plurality of power transistors connected in series along their emitter-collector paths.

5. A precision system as in claim 1, wherein said function generating means comprises a data memory which stores said desired tool position in relation to said tool position along said second direction.

6. A precision system as in claim 1, wherein said first measuring means includes a counter which increments said second direction position signal when said tool is moved each predetermined distance in a direction perpendicular to said first direction, said second direction position signal being applied to said function generating means.

7. A precision system as in claim 1, wherein said function generating means produces an indication of the difference between a present said desired tool position and a next desired tool position.

8. A precision system as in claim 1, wherein said second comparing means comprises hold circuit means for retaining a tool position along said first direction measured by said second measuring means; and a comparator for producing said tool support drive means control signal when a difference between said position retained by said hold circuit means and said desired tool position exceeds said predetermined value.

9. A precision system for controlling the movement of a tool which moves relative to a workpiece to machine said workpiece into a desirable shape, said precision system comprising:

a tool holding unit for holding said tool;

a tool support operatively connected to said tool holding unit for holding said tool holding unit;

fine displacing drive means operatively connected to said tool holding unit for driving said tool holding unit relative to said tool support and along a first direction, in response to a fine displacing drive means control signal;

first tool support drive means operatively connected to said tool support for moving said tool support relative to said workpiece along first direction by a predetermined amount in response to a tool support drive means control signal;

second tool support drive means operatively connected to said tool support for moving said tool support relative to said workpiece along a second direction perpendicular to said first direction in accordance with a predetermined pattern of movement in said second direction;

first measuring means operatively associated with said tool holding unit for measuring said tool position with respect to said workpkece along said second direction with accuracy higher than that to which said second tool support drive means can respond, and for outputting a second direction position signal;

function generating means operatively connected to said first measuring means for receiving said second direction position signal from said first measuring means and producing a desired position signal corresponding to a desired tool position along said first direction;

second measuring means operatively associated with said tool holding unit for measuring said tool position with respect to said workpiece along said first direction with accuracy higher than that to which said first tool support drive means can respond, and for outputting a first position signal;

first comparing means operatively connected to said function generating means and second measuring means for receiving said desired position signal from said function generating means and for receiving said first position signal from said second measuring means, and for producing said fine displacing drive means control signal, representing a difference between said desired tool position and said tool position along said first direction and being operatively connected to said fine displacing drive means for controlling the operation of said fine displacing drive means for driving said tool holding unit while said first and second tool support drive means are operating; and second comparing means operatively connected with said function generating means and second measuring means for receiving said desired position signal from said function genergting means and for receiving said first position signal from said second measuring means and for producing said tool support drive means control signal, in accordance with the difference between said desired position signal and said first position signal; and computing means for adding said tool support drive means control signal to said desired position signal from said function generating means and being operatively connected to said tool support drive means for causing said tool support drive means to move said tool support relative to said workpiece along said first direction.

10. A precision system as in claim 9, wherein said second tool support drive means includes servo drive means for setting a feed rate of said tool in said second direction in accordance with said predetermined pattern of movement.

11. A precision system as in claim 9 wherein each of said first and second measuring means comprises a laser interferometer device.

12. A precision system as in claim 9, wherein said fine displacing means comprises a piezo-electric element.

13. A precision system as in claim 9, wherein said fine displacing controlling means comprises a drive circuit having a plurality of power transistors connected in series along their emitter-collector paths.

14. A precision system as in claim 9, wherein said function generating means comprises a data memory which stores said desired tool position in relation to said tool position along said second direction.

15. A precision system as in claim 9, wherein said first measuring means includes a counter which increments said second direction position signal when said tool is moved each predetermined distance in a direction perpendicular to said first direction, said second direction position signal being applied to said function generating means.

16. A precision system as in claim 9, wherein said function generating means produces an indication of the difference between a present said desired tool position and a next desired tool position.

* * * * *